(12) United States Patent
Bromenshenkel et al.

(10) Patent No.: US 8,516,396 B2
(45) Date of Patent: Aug. 20, 2013

(54) OBJECT ORGANIZATION BASED ON USER INTERACTIONS WITHIN A VIRTUAL ENVIRONMENT

(75) Inventors: Derek L. Bromenshenkel, Rochester, MN (US); Ryan K. Cradick, Oronoco, MN (US); Zachary A. Garbow, Rochester, MN (US); Daniel L. Hiebert, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/362,615

(22) Filed: Jan. 30, 2009

(65) Prior Publication Data

US 2010/0198653 A1 Aug. 5, 2010

(51) Int. Cl.
*G06F 3/048* (2006.01)
(52) U.S. Cl.
USPC .................... 715/848; 345/30; 705/9; 705/10
(58) Field of Classification Search
None
See application file for complete search history.

(56) References Cited

U.S. PATENT DOCUMENTS

| 2005/0203790 A1* | 9/2005 | Cohen | 705/9 |
| 2007/0168357 A1* | 7/2007 | Mo | 707/10 |
| 2010/0205043 A1* | 8/2010 | Edwards | 715/848 |

* cited by examiner

*Primary Examiner* — Alvin Tan
*Assistant Examiner* — Ayesha Huertas Torres
(74) *Attorney, Agent, or Firm* — Patterson & Sheridan LLP

(57) ABSTRACT

Embodiments of the invention provide techniques for arranging virtual objects within an immersive virtual environment. In one embodiment, avatar characteristics, viewport/display characteristics, and object/location characteristics may be analyzed to determine a degree of visibility of various locations within a virtual space to a user. Further, past user interactions within the immersive virtual environment may be analyzed to determine which portions of the user's viewport, when including virtual objects that are offered for sale, are most likely to result in a sale to the user. A set of virtual objects may then be assigned to locations within the virtual space based on the determined visibility to the user, past purchases by the user, and characteristics of the virtual objects.

18 Claims, 5 Drawing Sheets

OBJECT ORGANIZATION BASED ON USER INTERACTIONS WITHIN A VIRTUAL ENVIRONMENT

BACKGROUND OF THE INVENTION

1. Field of the Invention

The field of the invention relates to presenting an immersive virtual environment to users of that environment; specifically, to performing searches of objects in the immersive environment.

2. Description of the Related Art

A virtual world is a simulated environment in which users may interact with one another via avatars. Users may also interact with virtual objects and locations of the virtual world. An avatar generally provides a graphical representation of an individual within the virtual world environment. Avatars are usually presented to other users as two or three-dimensional graphical representations of human or human-like images. Frequently, virtual worlds allow multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, but may also include real-time voice and/or video communications.

Virtual worlds may be persistent. A persistent world provides an immersive environment (e.g., a fantasy setting used as a setting for a role-playing game) that is generally always available, and world events continue to occur, regardless of the presence of a given avatar. Thus, unlike many conventional online multi-player games or multi-user environments, the plot and events continue to develop even while a user is not present within the virtual environment.

SUMMARY OF THE INVENTION

One embodiment of the invention includes a computer-implemented method for presenting virtual objects to a user represented in a virtual environment using an avatar. The method may generally include receiving an indication to present the user with a plurality of virtual objects, each virtual object having a relative priority of presentation. In response to receiving the indication, for a plurality of available locations in the virtual environment, a likelihood that presenting a virtual object in the location will result in a desired interaction by the user with the presented virtual object may be determined. The method may further include assigning, based on at least the likelihoods determined for the plurality of locations and on the relative priorities of the plurality of virtual objects, the plurality of virtual objects to at least some of the plurality of available locations. The method may also include presenting the user with the plurality of virtual objects in their assigned available locations.

Another embodiment of the invention includes a computer-readable storage medium including a program, which when executed on a processor performs a method for presenting virtual objects to a user of a virtual environment. The operation may generally include receiving an indication to present the user with a plurality of virtual objects, each virtual object having a relative priority of presentation. In response to receiving the indication, for a plurality of available locations in the virtual environment, a likelihood that presenting a virtual object in the location will result in a desired interaction by the user with the presented virtual object may be determined. The operation may also include assigning, based on at least the likelihoods determined for the plurality of locations and on the relative priorities of the plurality of virtual objects, the plurality of virtual objects to at least some of the plurality of available locations. The operation may also include presenting the user with the plurality of virtual objects in their assigned available locations.

Still another embodiment of the invention includes a system having a processor and a memory containing a program, which when executed by the processor is configured to perform an operation. The operation may generally include the steps of receiving an indication to present the user with a plurality of virtual objects, each virtual object having a relative priority of presentation. In response to receiving the indication, for a plurality of available locations in the virtual environment, a likelihood that presenting a virtual object in the location will result in a desired interaction by the user with the presented virtual object may be determined. The operation further perform the steps of assigning, based on at least the likelihoods determined for the plurality of locations and on the relative priorities of the plurality of virtual objects, the plurality of virtual objects to at least some of the plurality of available locations. The operation may further perform the steps of presenting the user with the plurality of virtual objects in their assigned available locations.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 2:
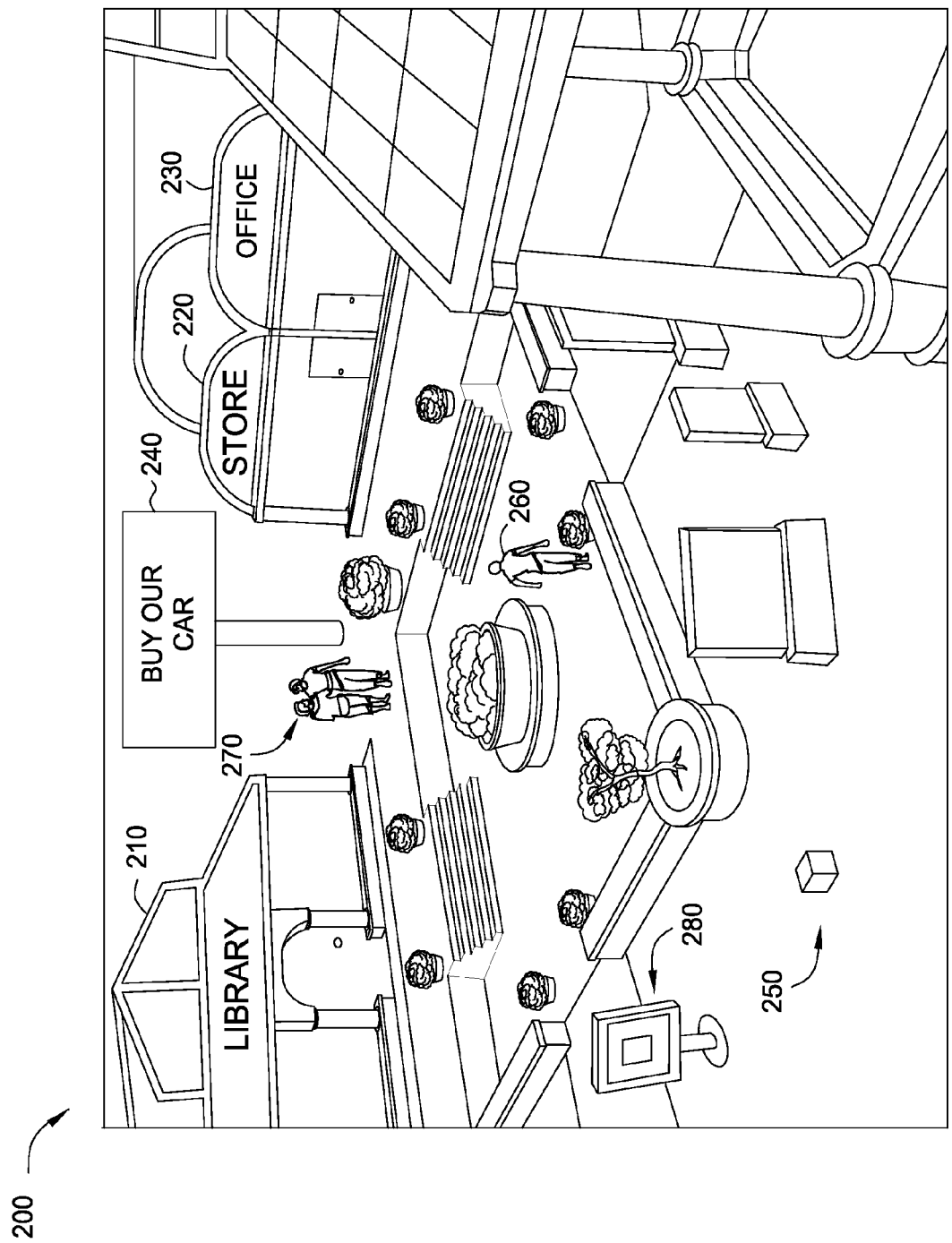
FIG. 2 illustrates a user display for a user participating in a virtual world, according to one embodiment of the invention.

A virtual world is a simulated environment in which users may inhabit and interact with one another via avatars. Also, while in a virtual world, users may interact with elements of the virtual world. For example, FIG. 2 illustrates a user display 200 for a user participating in a virtual world, according to one embodiment of the invention. In this example, the user is represented by avatar 260, which is visible to other users of the virtual world. In turn, other users of the virtual world are represented by avatars 270. Thus, the user represented by avatar 260 may interact with the other users by interacting with avatars 270. Further, the user may interact with virtual objects displayed in user display 200. For example, the user may interact with a box 250 by causing the avatar 260 to pick it up, interact with a kiosk 280 by causing the avatar to move proximate to the avatar requesting information, etc. In addition, a user may interact with virtual spaces of the virtual world. For example, the user may be able to enter virtual spaces such as a store 220, an office 230, or a library 210. Still further, text may be displayed to the users of the virtual world through billboard 240.

In some situations, virtual spaces may include virtual objects that are displayed to a user from the perspective of their avatar. For example, assume the avatar 260 enters the store 220. The user display 200 may then present the user with a variety of virtual objects (not shown) that are available for purchase. Such virtual objects may be arranged within the store 220 in a manner that increases the likelihood of an interaction by the user, in particular a purchase of a virtual object by the user. For example, virtual goods having a high profit margin may be arranged such that they are in a position of relatively high visibility to the user. In contrast, virtual goods having a low or negative profit margin (e.g., "loss leader" promotions) may be arranged such that they are in a position of relatively low visibility to the user.

Embodiments of the invention provide techniques for arranging virtual objects within an immersive virtual environment. In one embodiment, avatar characteristics (e.g., height, width, shape, etc.), viewport/display characteristics (e.g., user's point of view, display resolution, etc.), and object/location characteristics (e.g., lighting, color, etc.) may be analyzed to determine a degree of visibility of various locations within a virtual space to a user. Further, past user interactions within the immersive virtual environment may be analyzed to determine which portions of the user's viewport, when including virtual objects that are offered for sale, are most likely to result in a sale to the user. A set of virtual objects may then be assigned to locations within the virtual space based on the determined visibility to the user, past purchases by the user, and the relative priority of each virtual object (e.g., priority, profit margin, promotions, etc.).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
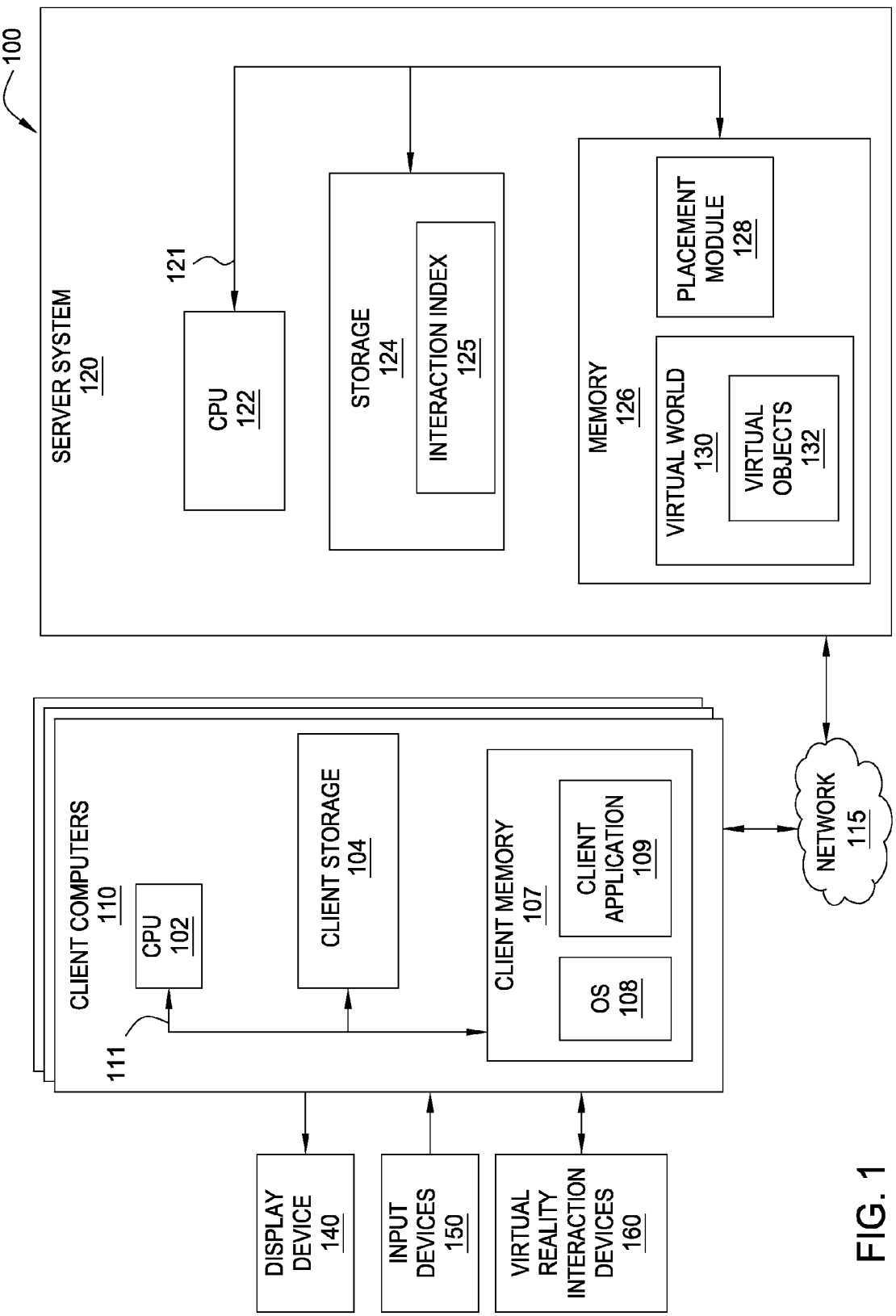
FIG. 1 is a block diagram that illustrates a client-server view of computing environment configured for searching virtual objects, according to one embodiment of the invention.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 may include a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, client application 109 provides a software program that allows a user to connect to a virtual world 130 on server 120, and once connected, to explore and interact with the virtual world 130. Further, client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to virtual world 130. Such a display may include content from the virtual world determined from the user's line of sight at any given time. The display may be presented in a first-person perspective, meaning the view of the virtual world 130 is generated as though seen through the eyes of the avatar representing the user. Alternatively, the display may be presented from a third-person perspective, meaning the view of the virtual world 130 as seen from a point of view outside the avatar, such that the user's avatar may be included in the display (e.g., the user display 200 illustrated in FIG. 2). In either case, the view available to a user may be referred to herein as a "viewport."

The user may view the virtual world using a display device 140, such as an LCD or CRT monitor display, and interact with the client application 109 using input devices 150. Further, in one embodiment, the user may interact with client application 109 and virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 130.

In one embodiment, server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Memory 126 includes the virtual world 130 and a placement module 128. In one embodiment, the virtual world 130 may be a software application that allows a user to explore and interact with an immersive environment. Illustratively, virtual world 130 includes virtual objects 132. Virtual objects 132 may include all elements of virtual world 130 that may be presented to a user. For example, referring to FIG. 2, virtual objects 132 may include box 250, store 220, library 210, etc. In one embodiment, the storage 124 includes an interaction index 125, representing data describing past interactions of users with virtual objects 132. The interaction index 125 is described in greater detail below with reference to the placement module 128.

In one embodiment, the placement module 128 may be a software application configured to determine locations for presenting virtual objects 132 to a user of the virtual world 130. More specifically, the placement module 128 may analyze avatar characteristics, previous behavior, viewport/display characteristics, object characteristics, and/or location characteristics. The placement module 128 may then determine degrees of visibility of virtual objects 132 in various locations within a virtual space with respect to a given user (and corresponding avatar).

Further, the placement module 128 may assign virtual objects 132 to the various locations according to the visibility of each location and the relative priority of presentation for each virtual object 132. That is, the placement module 128 may assign virtual objects 132 having a relatively high priority of presentation in locations that have a higher degree of visibility to the user, such that the user is more likely to interact with higher-priority virtual objects 132. Once assigned to particular locations, the virtual objects 132 may be presented to the user in those locations. In one embodiment, different users present in the same space of the virtual world 130 may be presented with different arrangements of virtual objects 132. For example, two users present inside the store 220, when both are looking at the same location, may each be presented with a different virtual object 132 in that location. Such customized presentations may be performed using the placement module 128, as described herein. Optionally, virtual goods may be presented to a group of users in a consistent manner, such that all users in the group see the same assignment of virtual goods to locations. Note that, as used herein, the term "location" may refer to a location or space in the virtual word 130 that is defined as available for presenting a virtual object 132.

Figure 3B:
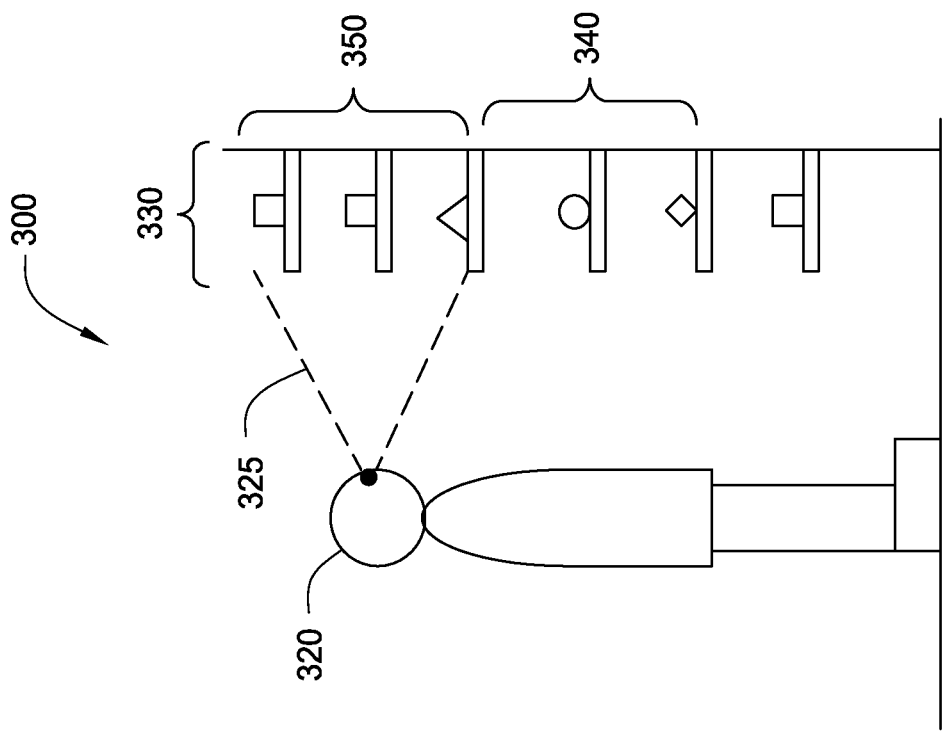
FIGS. 3A-3B illustrate examples of determining degrees of visibility of various locations based on avatar characteristics, according to one embodiment of the invention.
Figure 3A:
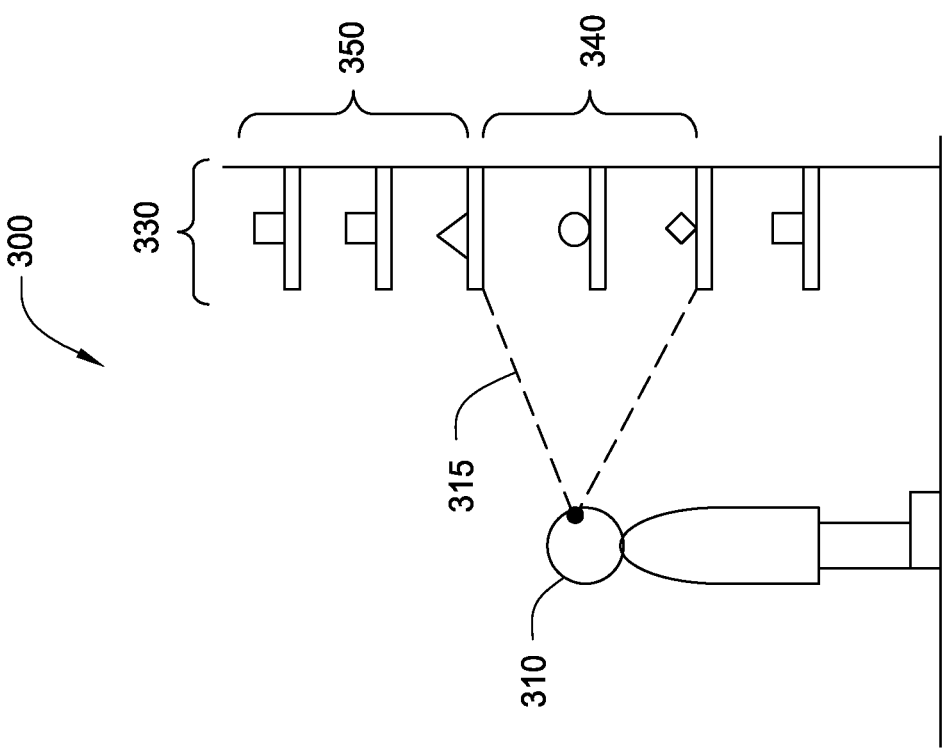

FIGS. 3A-3B illustrate examples of determining degrees of visibility of various locations based on avatar characteristics, according to one embodiment of the invention. Referring to FIG. 3A, assume that a first avatar 310 enters a store interior 300 (e.g., representing the interior of store 220 shown in FIG. 2). Assume also that the store interior 300 includes a set of display shelves 330 at various heights. The first avatar 310 may have a view zone 315 (illustrated with dotted lines), representing the portion of the virtual world 130 that is in sight of the "eyes" of the first avatar 310. Thus, in the case that the user of the first avatar 310 is viewing the virtual world 130 from a first-person perspective, the view zone 315 may also represent the portion of the virtual world 130 presented to the user (e.g., in user display 200).

As shown, the view zone 315 includes the shelf area 340, which is located at approximately the same eye level as the first avatar 310. However, the view zone 315 does not include the shelf area 350, which is located substantially above the eye level of the first avatar 310. Referring now to FIG. 3B, assume that a second avatar 320 enters the store interior 300. In this example, the avatar 320 is significantly taller than the first avatar 310. Thus, the view zone 325 of the second avatar 320 includes the shelf area 350, but does not include the shelf area 340. In other words, the respective view zones of each avatar may be dependent on the height of the avatar. Accordingly, in the case of avatar 310, the placement module 128 may determine that shelf area 340 will have a highest degree of visibility, and may thus assign higher-priority virtual objects 132 to shelf area 340, in the case of avatar 320, the placement module 128 may determine that shelf area 350 will have a highest degree of visibility, and may thus assign high priority virtual objects 132 to shelf area 350.

Note that, while FIGS. 3A-3B illustrate examples of determining a view zone of an avatar based on the height of the avatar, it is contemplated that determining the view zone of an avatar may also be based on other avatar characteristics. For example, the view zone may also depend on the width or posture of an avatar. Further, the view zone of an avatar may be limited by a maximum visual range that may be specified for all avatars in the virtual world 130, or a maximum visual range specified for the specific avatar. Furthermore, it is noted that an avatar of a virtual world need not have a strictly human-like form, but may instead take any form desired by the user (e.g., an animal, a plant, imaginary or mythical creatures, etc.). Thus, the view zone of an avatar may also depend on characteristics such as the shape of an avatar, the position of eyes on the avatar, the number of eyes on the avatar, and the like.

In one embodiment, the placement module 128 may analyze characteristics of the user's viewport to determine a degree of visibility of various locations within a virtual space to a user. For example, the placement module 128 may determine that a user viewing the virtual world 130 from a first-person perspective will have a view zone perceived through the eyes of the user's avatar. In contrast, the placement module 128 may determine that a user viewing the virtual world 130 from a third-person perspective may have a view zone perceived from a point in space above and behind the user's avatar. Further, the placement module 128 may determine degrees of visibility of locations based on a size and/or resolution of any display device 140 used by the user, or based on display characteristics of any virtual reality interaction devices 160 used by the user. In one embodiment, the placement module 128 may receive (by way of the network 115) data from the client application 109, specifically data describing any display device 140 and/or virtual reality interaction devices 160 used by the user.

In one embodiment, the placement module 128 may also analyze characteristics of the locations within the virtual world 130 and characteristics of the virtual objects 132. For example, the placement module 128 may determine the visibility of locations based on the lighting present at each location, such as "sunlight" available in the virtual world 130, light sourced from virtual light bulbs inside the store 220, and the like. Further, the placement module 128 may also evaluate the optical characteristics of any space between the user and locations of the virtual world 130 (e.g., distortion due to hot air, blurriness if present in a virtual underwater location, transparency of a glass display case, and the like). Furthermore, the placement module 128 may also analyze characteristics of the virtual objects 132 being assigned to locations within the virtual world 130. For example, the placement module 128 may determine the visibility of locations based on object size, shape, surface texture, reflectivity, color, and the like.

In one embodiment, the placement module 128 may assign virtual objects 132 to locations of the virtual world 130 based on user preferences for interactions with virtual objects 132. More specifically, the placement module 128 may analyze data describing past instances of desired user interactions, such as purchases of virtual object 132. As described, such data may be stored in the interaction index 125. The placement module 128 may then determine which regions or portions of the user's viewport are preferred by the user (or groups of users believed to share common characteristics), meaning the portions most likely to result in the desired interaction when including virtual objects 132. The placement module 128 may assign scores to the portions of the viewport, representing the relative likelihood that the user will interact with a virtual object 132 included in that portion.

Figure 4:
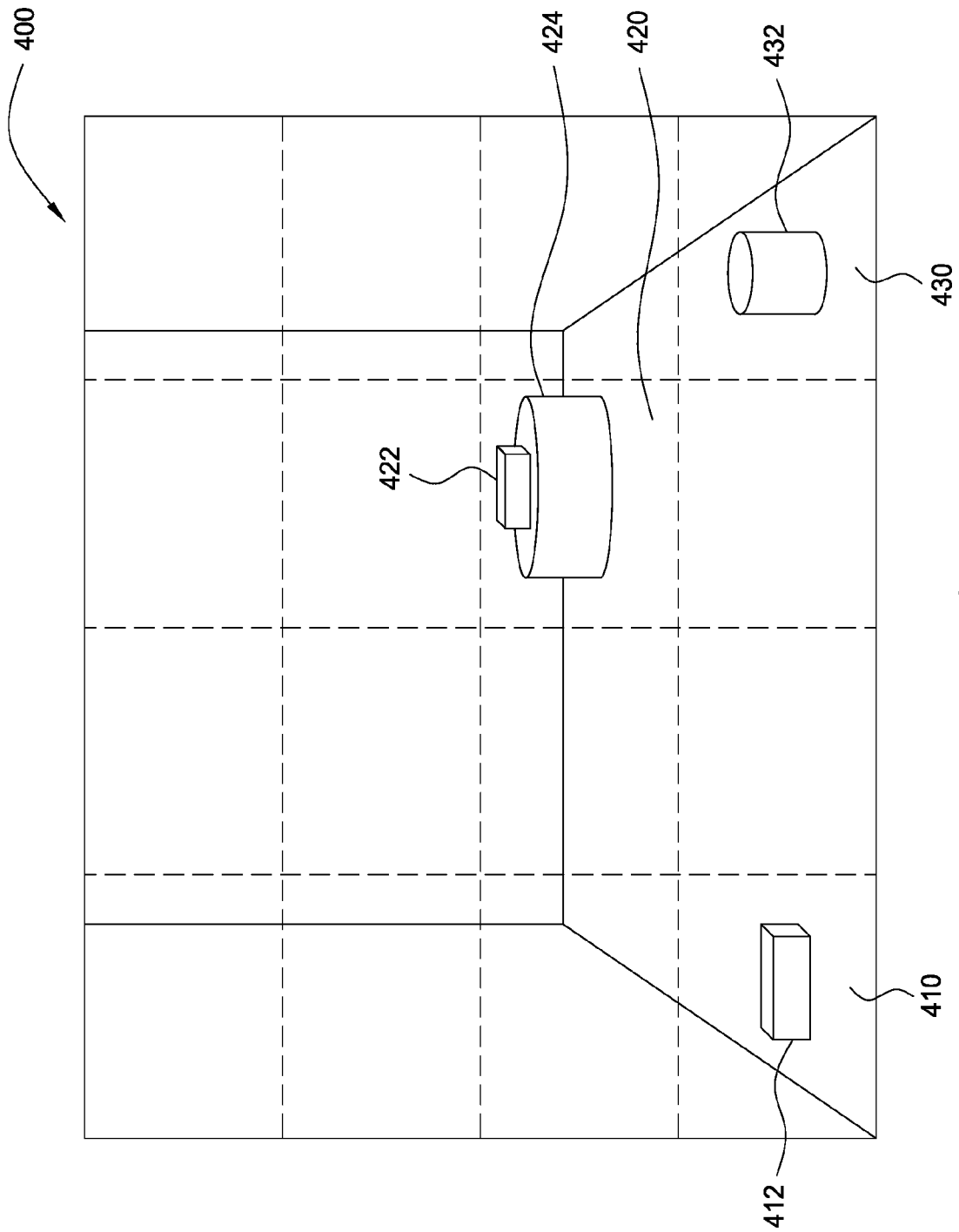
FIG. 4 illustrates an example of analyzing a user viewport to determine which portions of the viewport are most likely to result in an interaction, according to one embodiment of the invention.

FIG. 4 illustrates an example of analyzing a viewport 400 to determine which portions of the viewport are most likely to result in an interaction, according to one embodiment of the invention. Assume that viewport 400 represents a first-person view presented to a user of the virtual world 130 (i.e., the view seen through the eyes of the user's avatar). In this example, the viewport 400 is divided into a four-by-four grid, thus resulting in sixteen rectangular portions (e.g., portion 410 in the lower-left corner of the viewport 400). Of course, the viewport 400 is provided for the sake of example, and is not intended to limit the invention. It is contemplated that a viewport may be divided into any number of portions, or into portions of different shapes, as may be suited to a particular use. That is, object placement may be determined by not only looking at the user's current viewport but at all available locations the user might look.

As shown, the viewport 400 includes several virtual objects 132, including a box 412 (in portion 410), a second box 422 located on a stand 424 (in portion 420), and a cylinder 432 (in portion 430). Assume that, in this example, the user purchases the box 412. In response, the interaction index 125 may be updated to include a data record describing the current interaction between the user and the box 412. Specifically, the data record may include an identifier and/or a description of the portion of the viewport 400 which included the box 412, namely the portion 410. Further, the data record may also include other data describing the interaction, such as an identifier for the user, an identifier for the box 412, a date/time stamp of the interaction, a virtual location of the interaction (e.g., store 220), a type of interaction (e.g., a user purchase), and the like. Furthermore, the data record may describe other virtual objects 132 related to the user interaction. For example, the data record may describe the number of other virtual objects 132 present in the viewport 400 at the time of the interaction, the locations of those other virtual objects 132, and the like. In the case that the user interacts with multiple virtual objects 132 in the same instance (e.g., the user purchases an object and related accessories), multiple data records may be created in the interaction index 125, including data describing the relationship between the multiple virtual objects 132.

In one embodiment, the placement module 128 may analyze one or more data records in the interaction index 125 to determine which portions of the viewport 400 are most likely to result in a desired interaction with a given user. Such analysis may be limited to past interaction(s) of the same user. Optionally, such analysis may include aggregations of past interactions of multiple users. In the case of data from multiple users, the data may be aggregated according to similarities to the current user (e.g., data records for users having similar age, interests, job, etc.).

In one embodiment, the placement module 128 may calculate scores for each location based on combinations of the factors described above, such as avatar characteristics, viewport/display characteristics, object/location characteristics, and user preferences determined from past interactions. In this calculation, each factor may be evaluated according to a relative weight or importance defined by a user or by an administrator of the virtual world 130. Each score may represent the relative likelihood that assigning a virtual object to a given location will result in a desired interaction with the current user.

Of course, the embodiments described above are intended to be illustrative, and are not limiting of the invention. Other embodiments are broadly contemplated. For example, interaction index 125 may be stored on client computer 110, rather than on server 120. Further, while the software components included in FIG. 1 are illustratively shown as separate components, it is contemplated that functionality of any component may be incorporated in other component(s). It is also contemplated that the function of placement module 128 may be provided as a commercial service. For example, an owner of the store 220 may be provided with fee-based access to the placement module 128, such that the merchant may selectively assign virtual goods to locations within the store 220 to suit any avatars that enter the store 220.

Figure 5:
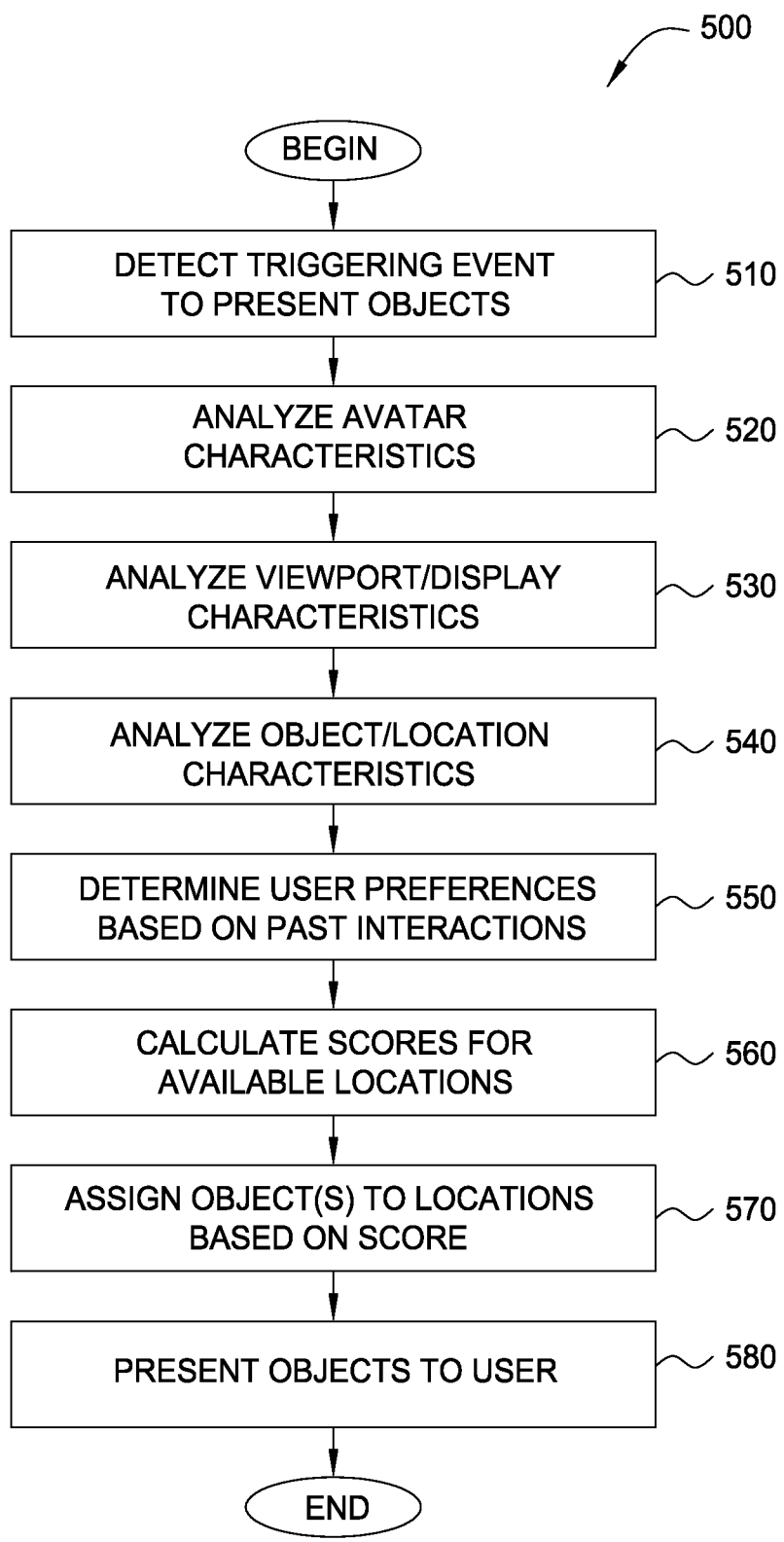
FIG. 5 is a flow diagram illustrating a method for assigning virtual objects to locations of a virtual world, according to one embodiment of the invention.

FIG. 5 is a flow diagram illustrating a method 500 for assigning virtual objects to locations of a virtual world, according to one embodiment of the invention. Persons skilled in the art will understand that, even though the method is described in conjunction with the system of FIG. 1, any system configured to perform the steps of method 500, in any order, is within the scope of the present invention.

The method 500 begins at step 510 by detecting a triggering event to present virtual objects to a user of the virtual world. The triggering event may be an action or movement performed by the user. For example, assume the user enters the store 220 illustrated in FIG. 2. In one embodiment, the action of opening the door of the store 220 may trigger the presentation of virtual objects in locations within the store 220. In another embodiment, the movement of the avatar 260 into the store 220 may trigger the presentation of virtual objects. That is, the trigger may be the avatar's movement across a predefined threshold or checkpoint, rather than the performance of a specific action. In yet another embodiment, the user's presence in a given location may be a triggering event. For example, the presence of avatar 260 within the store 220 may be a triggering event. In another example, at start-up, the avatar 260 may appear at a given location. The avatar's appearance may be a triggering event that results in the presentation of virtual objects at the given location.

At step 520, characteristics of the user's avatar may be analyzed to determine degrees of visibility of locations in the virtual world 130 with respect to the user. In one embodiment, a placement module 128 (shown in FIG. 1) may analyze characteristics (e.g., height, width, shape, etc.) of the user's avatar. For example, referring to FIG. 3A, due to the height of avatar 310, the location having the highest degree of visibility is the shelf area 340.

At step 530, characteristics of the user's viewport and display may be analyzed to determine the user's view of locations in the virtual world 130. For example, the placement module 128 may analyze the point of view shown to the user (e.g., first person or third person perspective), the size and resolution of a display device, the type of display, and the like.

At step 540, characteristics of virtual objects 132 and of locations within the virtual world 130 may be analyzed to determine the visibility of the objects in various locations with respect to the user. For example, the placement module 128 may analyze lighting conditions, optical characteristics, and object characteristics (e.g., size, shape, surface texture, reflectivity, or color of virtual objects 132).

At step 550, user preferences may be determined based on past interactions with virtual objects 132. For example, the placement module 128 may analyze the interaction index 125 (shown in FIG. 1) to determine which portions of the user's viewport are preferred by the user, meaning the portions most likely to result in the desired interaction when including virtual objects 132.

At step 560, scores may be calculated for the available locations. In one embodiment, each score may be based on one or more of the characteristics and preferences determined at steps 520, 530, 540, and 550. Each score may represent the relative likelihood that assigning a virtual object to a given location will result in a desired interaction with the current user. For example, the placement module 128 may calculate a score for a location based on a weighted combination of avatar characteristics, viewport/display characteristics, object/location characteristics, and user preferences determined from past interactions.

At step 570, virtual objects 132 may be assigned to the available locations based on the scores calculated at step 560 and a relative priority of presentation for each virtual object 132. The relative priority of presentation for a virtual object 132 may be specified by a user, or may be based on objective factors such as price, profit margin, promotional priorities, etc. For example, the placement module 128 may assign a virtual object 132 having a relatively high priority of presentation in to a location having a high score, indicating a location determined to be likely to result in a desired interaction with the current user. At step 580, the virtual objects 132 may be presented to the current user in their assigned locations within the virtual world 130. After step 580, the method 500 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method to present a plurality of virtual objects to a user represented in a virtual environment by an avatar, comprising:
   receiving an indication to generate, for the user, an avatar-specific arrangement of the plurality of virtual objects;
   determining a display priority for one or more of the plurality of virtual objects based on one or more characteristics of the plurality of virtual objects;
   prioritizing a plurality of display locations within the virtual environment based on (i) a height of the display location, (ii) an amount of lighting in the display location, and (iii) optical characteristics of a medium surrounding the display location;
   generating, based on: (i) one or more characteristics of the avatar, (ii) the determined display priority for each virtual object, and (iii) the priority of each display location, the avatar-specific arrangement of the plurality of prioritized virtual objects in the plurality of prioritized display locations in the virtual environment; and
   presenting, to the user, the generated, avatar-specific arrangement of the plurality of prioritized virtual objects in the plurality of prioritized display locations.

2. The computer-implemented method of claim 1, wherein the one or more characteristics of the avatar are selected from: (i) a height of the avatar, (ii) a width of the avatar, and (iii) a shape of the avatar.

3. The computer-implemented method of claim 1, wherein generating the avatar-specific arrangement of the plurality of prioritized virtual objects in the plurality of prioritized display locations is further based on at least one of: (i) a type of display device, (ii) a resolution of a display device, (iii) a size of a display device, and (iv) a point of view presented to the user.

4. The computer-implemented method of claim 1, wherein the one or more characteristics of the plurality of virtual objects are selected from: (i) a size of the virtual object, (ii) a shape of the virtual object, (iii) a surface texture of the virtual object, (iv) a reflectivity of the virtual object, and (v) a color of the virtual object.

5. The computer-implemented method of claim 1, wherein generating the avatar-specific arrangement of the plurality of prioritized virtual objects in the plurality of prioritized display locations further comprises analyzing one or more previous interactions of the user and the virtual environment.

6. The computer-implemented method of claim 5, wherein the previous interactions include at least a portion of a viewport which presented a virtual object to the user as part of the one or more previous interactions.

7. The computer-implemented method of claim 5, wherein at least one of the previous interactions are stored in a search index resulting from presenting the generated, avatar-specific arrangement of the prioritized virtual objects to the user in the plurality of prioritized display locations.

8. The computer-implemented method of claim 1, wherein the indication to generate, for the user, an avatar-specific arrangement of the plurality of virtual objects is selected from: (i) an action performed by the user in the virtual environment, (ii) a movement of the user within the virtual environment, and (iii) the presence of the user at a predetermined location of the virtual environment.

9. A computer-readable storage medium including a program, which when executed on a processor performs a method to present a plurality of virtual objects to a user represented by an avatar in a virtual environment, comprising:
  receiving an indication to generate, for the user, an avatar-specific arrangement of the plurality of virtual objects;
  determining a display priority for one or more of the plurality of virtual objects based on one or more characteristics of the plurality of virtual objects;
  prioritizing a plurality of display locations within the virtual environment based on (i) a height of the display location, (ii) an amount of lighting in the display location, and (iii) optical characteristics of a medium surrounding the display location;
  generating, based on: (i) one or more characteristics of the avatar, (ii) the determined display priority for each virtual object, and (iii) the priority of each display location, the avatar-specific arrangement of the plurality of prioritized virtual objects in the plurality of prioritized display locations in the virtual environment; and
  presenting, to the user, the generated, avatar-specific arrangement of the plurality of prioritized virtual objects in the plurality of prioritized display locations.

10. The computer-readable storage medium of claim 9 wherein the one or more characteristics of the avatar are selected from: (i) a height of the avatar, (ii) a width of the avatar, and (iii) a shape of the avatar.

11. The computer-readable storage medium of claim 9, wherein generating the avatar-specific arrangement of the plurality of prioritized virtual objects in the plurality of prioritized display locations is further based on at least one of: (i) a type of display device, (ii) a resolution of a display device, (iii) a size of a display device, and (iv) a point of view presented to the user.

12. The computer-readable storage medium of claim 9, wherein generating the avatar-specific arrangement of the plurality of prioritized virtual objects in the plurality of prioritized display locations further comprises analyzing one or more previous interactions of the user and the virtual environment.

13. The computer-readable storage medium of claim 12, wherein the previous interactions include at least a portion of a viewport which presented a virtual object to the user as part of the one or more previous interactions.

14. The computer-readable storage medium of claim 12, wherein at least one of the previous interactions are stored in a search index resulting from presenting the determined, avatar-specific arrangement of the prioritized virtual objects to the user in the plurality of prioritized display locations.

15. The computer-readable storage medium of claim 9, wherein the indication of a requirement to present the user with an avatar-specific arrangement of the plurality of virtual objects is selected from: (i) an action performed by the user in the virtual environment, (ii) a movement of the user within the virtual environment, and (iii) the presence of the user at a predetermined location of the virtual environment.

16. A system, comprising:
  a processor; and
  a memory containing a program, which when executed by the processor is configured to perform an operation to present a plurality of virtual objects to a user represented by an avatar in a virtual environment, the operation comprising the steps of:
    receiving an indication to generate, for the user, an avatar-specific arrangement of the plurality of virtual objects;
    determining a display priority for one or more of the plurality of virtual objects based on one or more characteristics of the plurality of virtual objects;
    prioritizing a plurality of display locations within the virtual environment based on: (i) a height of the display location, (ii) an amount of lighting in the display location, and (iii) optical characteristics of a medium surrounding the display location;
    generating, based on: (i) one or more characteristics of the avatar, (ii) the determined display priority for each virtual object, and (iii) the priority of each display location, the avatar-specific arrangement of the plurality of prioritized virtual objects in the plurality of prioritized display locations in the virtual environment; and
    presenting, to the user, the generated, avatar-specific arrangement of the plurality of prioritized virtual objects in the plurality of prioritized display locations.

17. The computer-readable storage medium of claim 9, wherein the one or more characteristics of the plurality of virtual objects are selected from: (i) a size of the virtual object, (ii) a shape of the virtual object, (iii) a surface texture of the virtual object, (iv) a reflectivity of the virtual object, and (v) a color of the virtual object.

18. A computer-readable storage medium including a program, which when executed on a processor performs a method to present a plurality of virtual objects to a user represented by an avatar in a virtual environment, comprising:
- receiving an indication to generate, for the user, an avatar-specific arrangement of the plurality of virtual objects;
- determining a display priority for one or more of the plurality of virtual objects based on one or more characteristics of the plurality of virtual objects, wherein the one or more characteristics of the plurality of virtual objects comprise: (i) a size of the virtual object, (ii) a shape of the virtual object, (iii) a surface texture of the virtual object, (iv) a reflectivity of the virtual object, and (v) a color of the virtual object;
- prioritizing a plurality of display locations within the virtual environment;
- generating, based on: (i) one or more characteristics of the avatar, (ii) the determined display priority for each virtual object, and (iii) the priority of each display location, the avatar-specific arrangement of the plurality of prioritized virtual objects in the plurality of prioritized display locations in the virtual environment; and
- presenting, to the user, the generated, avatar-specific arrangement of the plurality of prioritized virtual objects in the plurality of prioritized display locations.

* * * * *